United States Patent
Erickson et al.

(10) Patent No.: US 6,961,795 B2
(45) Date of Patent: *Nov. 1, 2005

(54) APPARATUS FOR SAFE INSTALLATION AND REMOVAL OF A CIRCUIT BOARD FOR HOT SWAP APPLICATIONS

(75) Inventors: Michael John Erickson, Loveland, CO (US); Richard K. Brush, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/623,173

(22) Filed: Jul. 21, 2003

(65) Prior Publication Data

US 2004/0104742 A1    Jun. 3, 2004

Related U.S. Application Data

(63) Continuation of application No. 09/272,798, filed on Mar. 29, 1999, now Pat. No. 6,625,681.

(51) Int. Cl.[7] ............................................. G06F 13/00
(52) U.S. Cl. ...................... 710/302; 710/301; 326/70
(58) Field of Search ............................... 710/300–304, 710/305–306; 713/324, 330; 326/70; 707/141–148

(56) References Cited

U.S. PATENT DOCUMENTS

| | | | |
|---|---|---|---|
| 4,245,270 A * | 1/1981 | Busby | 361/58 |
| 4,886,984 A * | 12/1989 | Nakaoka | 327/143 |
| 5,202,965 A * | 4/1993 | Ahn et al. | 710/302 |
| 5,317,697 A | 5/1994 | Husak et al. | |
| 5,586,271 A * | 12/1996 | Parrett | 710/302 |
| 5,604,873 A | 2/1997 | Fite et al. | |
| 5,758,102 A * | 5/1998 | Carey et al. | 710/302 |
| 5,910,690 A * | 6/1999 | Dorsey et al. | 307/141 |
| 6,487,624 B1 * | 11/2002 | Erickson et al. | 710/302 |
| 6,625,681 B1 * | 9/2003 | Erickson et al. | 710/302 |

* cited by examiner

Primary Examiner—Paul R. Myers
Assistant Examiner—Raymond N Phan (57) ABSTRACT

An apparatus and method for indicating and allowing hot swapping of a circuit board. During both insertion and extraction of a circuit board from a system, two inputs signals are generated from staggered pins located on the circuit board's connector. The inputs are processed through a NAND function implemented with transistors and output to two Schmitt trigger inverters connected in series. The output of the series connection of Schmitt trigger inverters goes high when both input signals are high and goes low when one of the inputs signals goes low. In addition, through the use of a resistor, capacitor combination connected to the input of the first Schmitt trigger inverter, the output signal remains high for a period of time after one of the input signals goes low. This additional period of time prevents any damage or disruption of signaling caused by transient current and voltage fluctuations as a circuit board is inserted or extracted. The output signal can be used in both single-ended and differential SCSI applications.

14 Claims, 6 Drawing Sheets

APPARATUS FOR SAFE INSTALLATION AND REMOVAL OF A CIRCUIT BOARD FOR HOT SWAP APPLICATIONS

This is a request for filing a continuing application under 37 CFR 1.53(b) a continuation application of application Ser. No. 09/272,798 filed Mar. 29, 1999 now U.S. Pat. No. 6,625,681.

FIELD OF INVENTION

The current invention relates to the safe installation and removal of a circuit board into a system during live bus activity in the system or when installation or removal of the circuit board needs to be detected.

BACKGROUND OF THE INVENTION

Hot swap capability refers to the ability to insert and remove circuit boards from a system without powering down the whole system. Several hot swap schemes are disclosed in the prior art employing mechanical, electrical and electromechanical means to allow circuit board insertion and extraction. Many schemes use staggered pin lengths to control power connection and disconnection and circuitry to connect and disconnect output drivers from control and signal buses. By using staggered pin lengths on the hot swappable cards, the circuit can detect a hot-insertion or hot-extraction and generate a corresponding signal. In a preferred embodiment, a circuit card is employed which uses three different pin lengths. Two of the pin lengths, long and short, provide the inputs to the state activated one shot with extended pulse timing for hot-swap applications.

SUMMARY OF THE INVENTION

The current invention allows for the detection of a hot-insertion or a hot-extraction of a circuit board from a system by generating a signal in the form of a pulse when either occurs. In addition, the pulse remains active for a period of time after the hot-insertion or hot-extraction terminates (i.e., the circuit board is completely inserted or completely removed). This additional period of time prevents any damage or disruption of signaling caused by transient current and voltage fluctuations as the circuit board is inserted or extracted as explained below. Consequently, the state activated one-shot with extended pulse timing is ideal for bus-resets during hot-swapping.

Furthermore, the state activated one shot isolates power domains. This is essential during hot-swap applications to prevent latch-up and unwanted powering of a board by input signals. When a CMOS part has higher potential on its input than on its voltage supply lines, current can flow through the inputs to the CMOS power domain. When this happens, the CMOS part can go into a state known as latch-up, where it will not work properly until power cycled. This is a problem in hot-swap applications, because a circuit board being installed will not be powered up immediately, whereas its inputs can already be high.

In the standard case, (one of the inputs is low), the state activated one shot separates inputs and on-board power domains. This prevents the inputs from sourcing current to the on-board power domain when the on-board power is off. This is useful when the state activated one shot is itself implemented on a hot-swappable circuit board, such as in the case of redundant hot-swappable circuit boards. When said board is hot installed into the system, its on board power is initially at zero potential. If one of the inputs to the one shot is high, while the other is low (this is almost always the case), then no current will flow through Q3 (see FIG. 1), and thus no leakage current will flow through the inputs.

Another advantage of the state activated one shot is that it prevents signal and data corruption. As a circuit board is inserted and removed, undesired signals such as voltage spikes can be generated on the signal lines, thereby corrupting the signals and associated data being passed through the system. The state activated one shot will prevent this corruption.

Finally, the state activated one shot is ideal for redundant hot-swappable circuit boards, thus eliminating the need to put circuitry on the midplane.

DETAILED DESCRIPTION OF THE INVENTION

In a preferred embodiment, the apparatus is connected to the staggered pins of a circuit board. In a board having three lengths of staggered pins, it receives as input two signals from the staggered pins. One input comes from the longest set of pins and one input comes from the shortest length set of pins. The two inputs are wired through a NAND function implemented using two Bipolar Junction Transistors or BJTs (see FIG. 1). When the circuit board is completely inserted, the signal from either the longest length set of pins or the shortest length set of pins is low and the other is high. The only time both input signals are high is when the board is in transition, i.e., when the board is either being inserted or extracted from the system.

Figure 1:
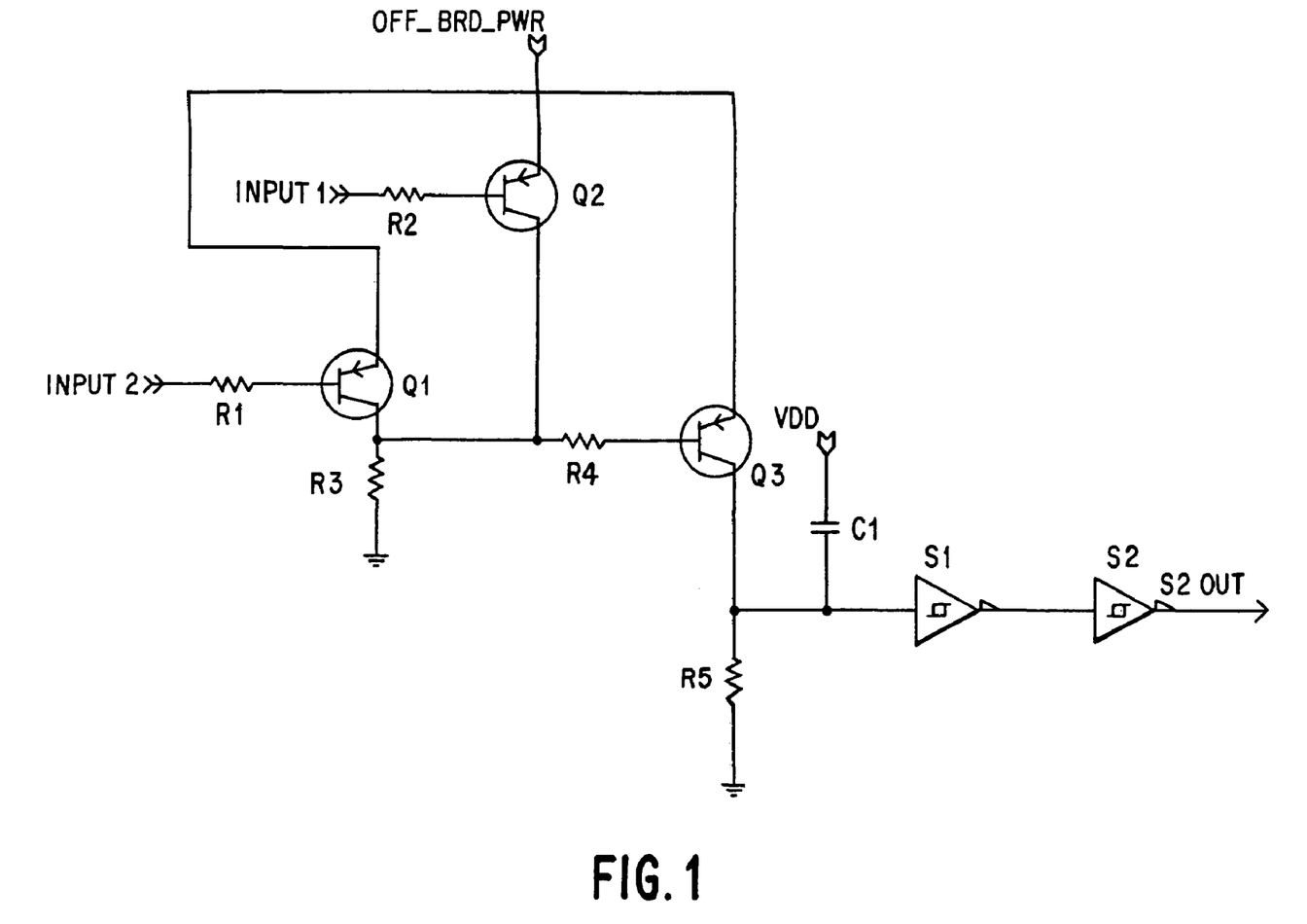
FIG. 1 is a logic block diagram for the State Activated One Shot with Extended Pulse Timing for Hot-Swap Applications.
Figure 2:
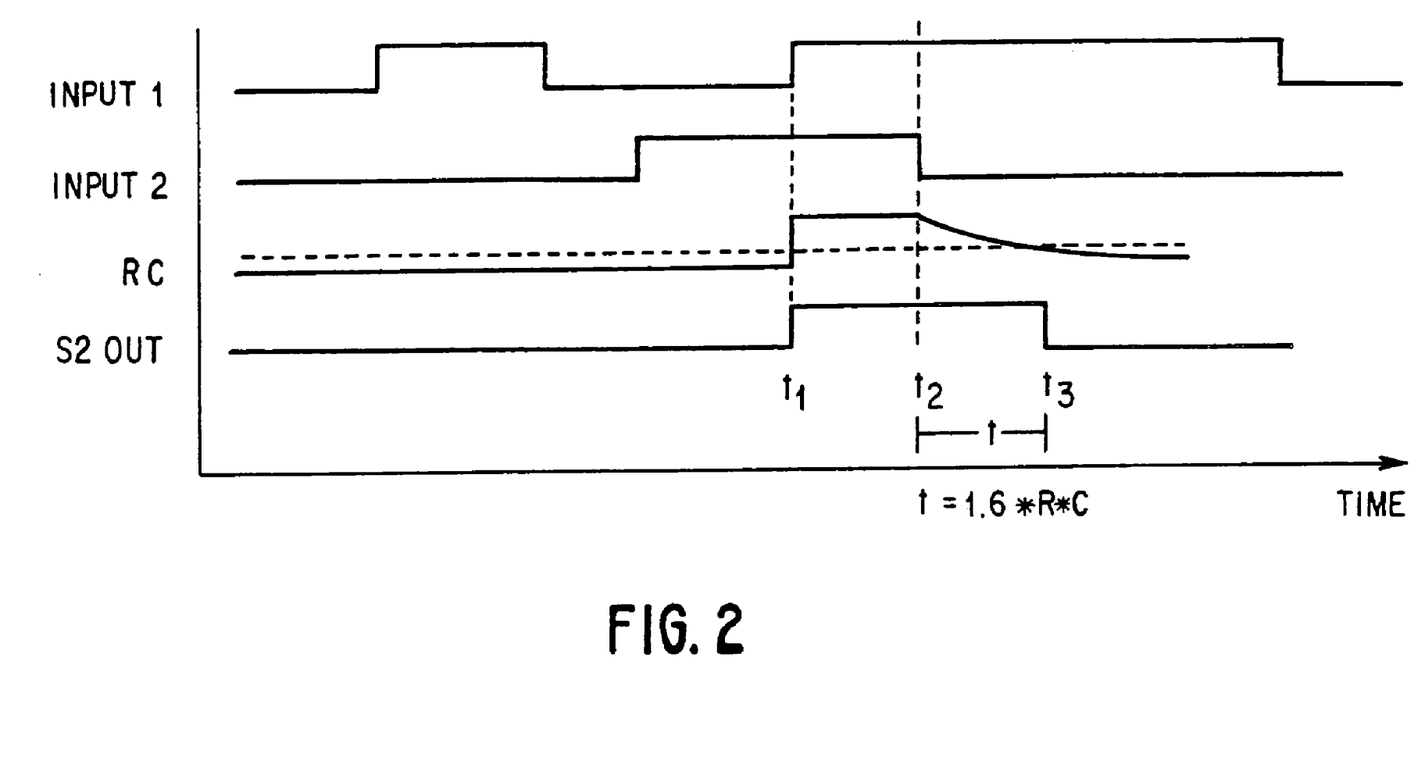
FIG. 2 is a timing diagram for the State Activated One Shot with Extended Pulse Timing for Hot-Swap Applications.

When both input 1 and input 2 are high (logic 1) (see time $t_1$ on FIG. 2), then neither Q1 or Q2 is biased on. (Both input 1 and input 2 are high when the board is in transition, i.e., being inserted or being extracted). Consequently, no current will flow through R3. The voltage at the collectors of Q1 and Q2 will be low or ground in this case (logic 0). This low (logic 0) will draw current from the base of Q3, causing Q3 to be biased on and causing current to flow through resistor R5. R5 will rapidly charge to voltage VDD (logic 1). This voltage is input to the Schmitt trigger inverter, S1, whose output will drop to low (logic 0). The input of inverter S2 is connected to the output of inverter S1. S2 will invert the low (logic 0) to a high (logic 1).

If either input 1 or input 2 goes low (logic 0) (see time $t_2$ on FIG. 2), then the corresponding transistor (Q1 or Q2) will be biased on. Consequently, current will flow through that transistor, either Q1 or Q2, causing current to flow through R3. This will produce a voltage across R3 causing a high (logic 1) to be output at both collectors of transistors Q1 and Q2. (In fact, the only time a high (logic 1) does not appear at the output of transistors Q1 and Q2 is when both input 1 and input 2 are high. See above. Therefore, transistors Q1 and Q2 function as a NAND gate). The voltage across resistor R3 is input to the base of transistor Q3. This biases Q3 off. Consequently, no current will flow through resistor R5 which is connected to the collector of transistor Q3. The voltage across R5 will be pulled to ground. As a result, the input of inverter S1 will be pulled to ground (logic 0). Inverter S1 will invert this input to a high (logic 1). The input of inverter S2 is connected to the output of inverter S1. S2 will invert the high (logic 1) to a low (logic 0).

However, the output of S2 will not switch to a low (logic 0) immediately. The voltage across resistor R5, VDD, will discharge to ground voltage through the R5, C1 combination, where C1 is the capacitor connected between voltage VDD and the end of resistor R5 not connected to ground. Since inverter S1 is a Schmitt trigger inverter, its output will not switch to (high) logic 1, until the voltage at the input to S1 crosses a positive going threshold voltage ($V_{T+}$). This will occur 1.6*R5*C1 seconds after input 1 or input 2 goes low (see time $t_3$ on FIG. 2). Inverter S2 inverts this low (logic 0) to a high (logic 1). Therefore, the RC combination acts to extend the time duration of the pulse at the output of inverter S2. It effectively acts as a time extender circuit. Consequently, the output pulse from inverter S2 remains asserted during the period of time when one or both inputs are logic 1 and for a time period after one of the inputs goes to logic 0, determined by the equation 1.6*R5*C1.

Figure 3:
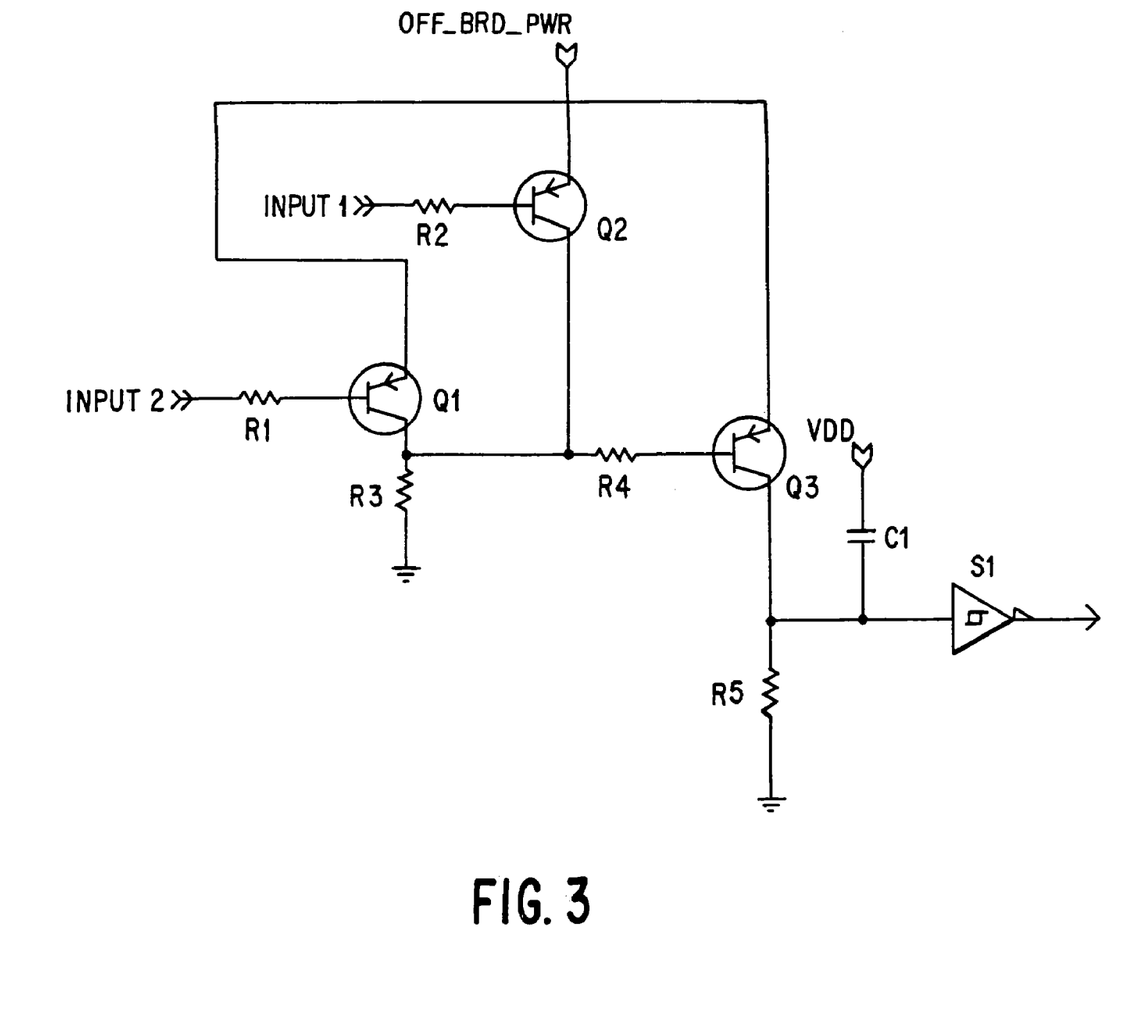
FIG. 3 is a logic block diagram for an embodiment of the State Activated One Shot with Extended Pulse Timing for Hot-Swap Applications comprising one less Schmitt trigger inverter for inverting the output.

In a second embodiment, the second Schmitt trigger inverter, S2, can be removed if opposite polarity is required (see FIG. 3).

Figure 4:
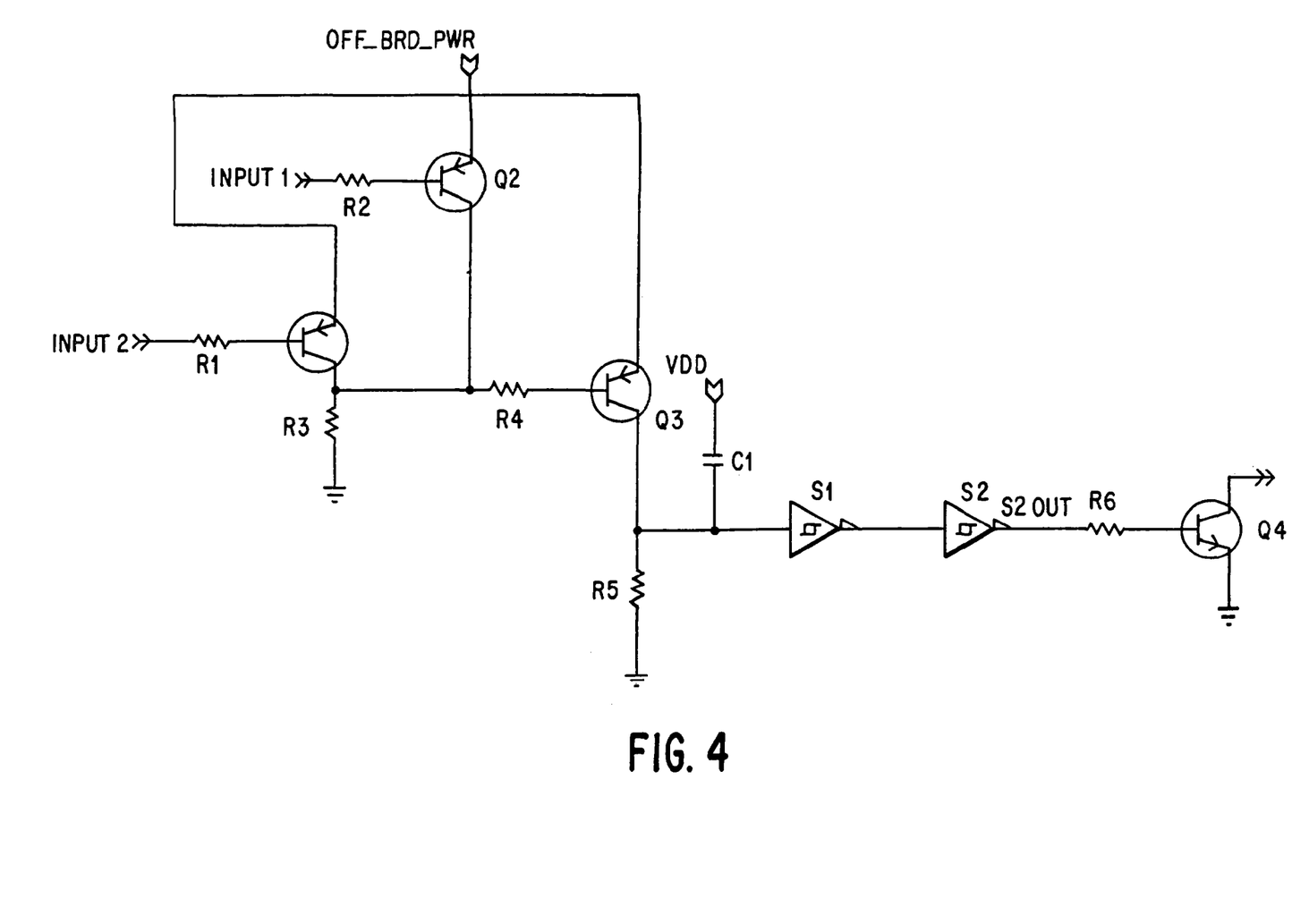
FIG. 4 is a logic block diagram for an embodiment of the State Activated One Shot with Extended Pulse Timing for Hot-Swap Applications further comprising an open collector output.

In still another embodiment, a series resistor, R6, connected to the base of a transistor, Q4, can be added if an open collector output is required, such as for Single-Ended SCSI applications (a SCSI bus reset during a hot-swap, for instance) (see FIG. 4).

Figure 5:
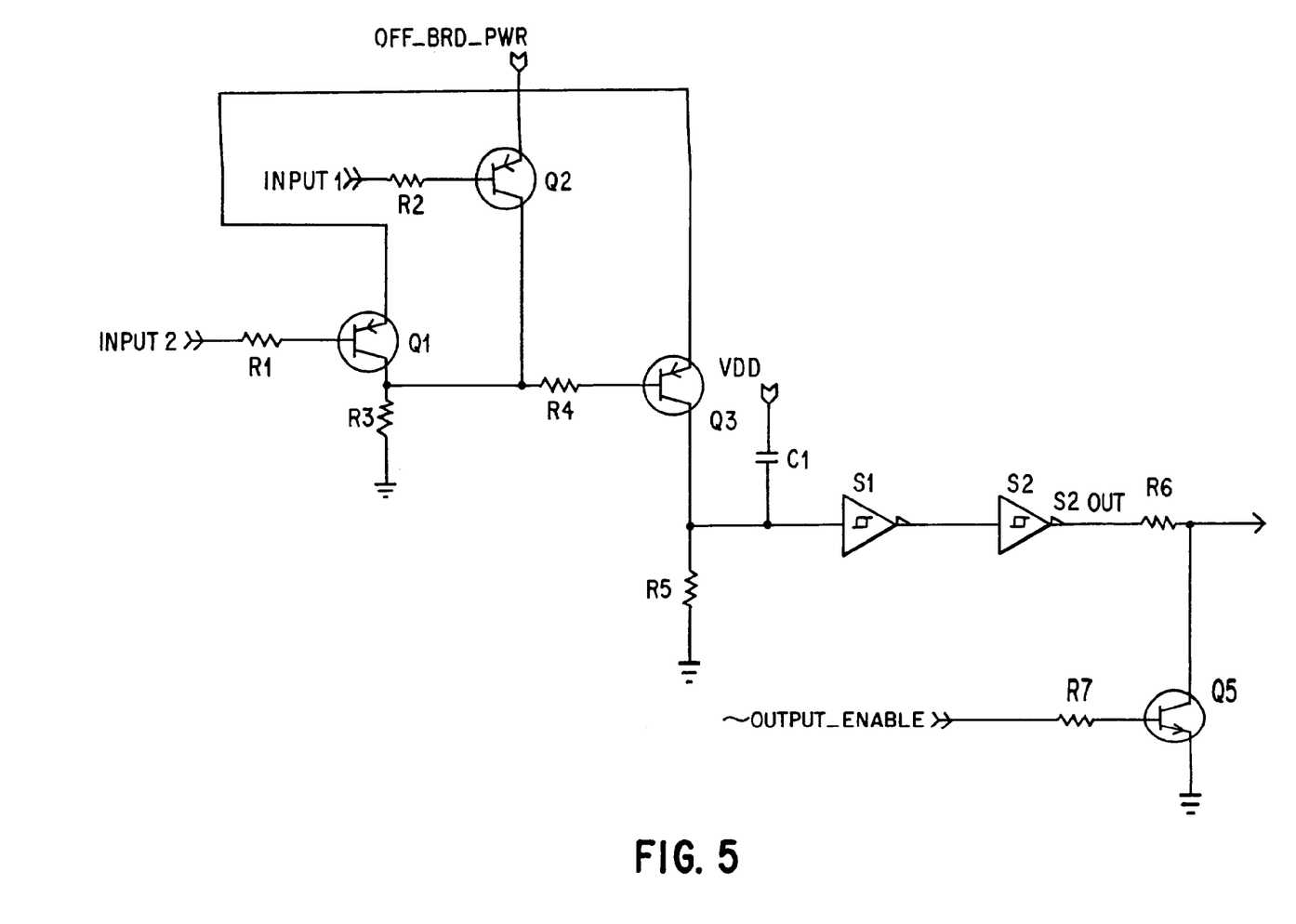
FIG. 5 is a logic block diagram for an embodiment of the State Activated One Shot with Extended Pulse Timing for Hot-Swap Applications further comprising an enable function.

In still another embodiment, an enable can be added to the state activated one-shot by attaching a NPN transistor, Q5, to the output of inverter S2 (See FIG. 5). The input of Q5 receives as input an enable signal, OUTPUT_ENABLE. In the case where OUTPUT_ENABLE is low, Q5 turns off and no current flows through Q5. Consequently, the output of inverter S2 is unaffected. On the other hand, when OUTPUT_ENABLE signal is high, Q5 turns on, thereby conducting current through resistor R6. Thus, Q5 acts like a current sink pulling current from the output of inverter S2. This drives the input of inverter S2 low (logic 0), thereby disabling the state activated one-shot.

Figure 6:
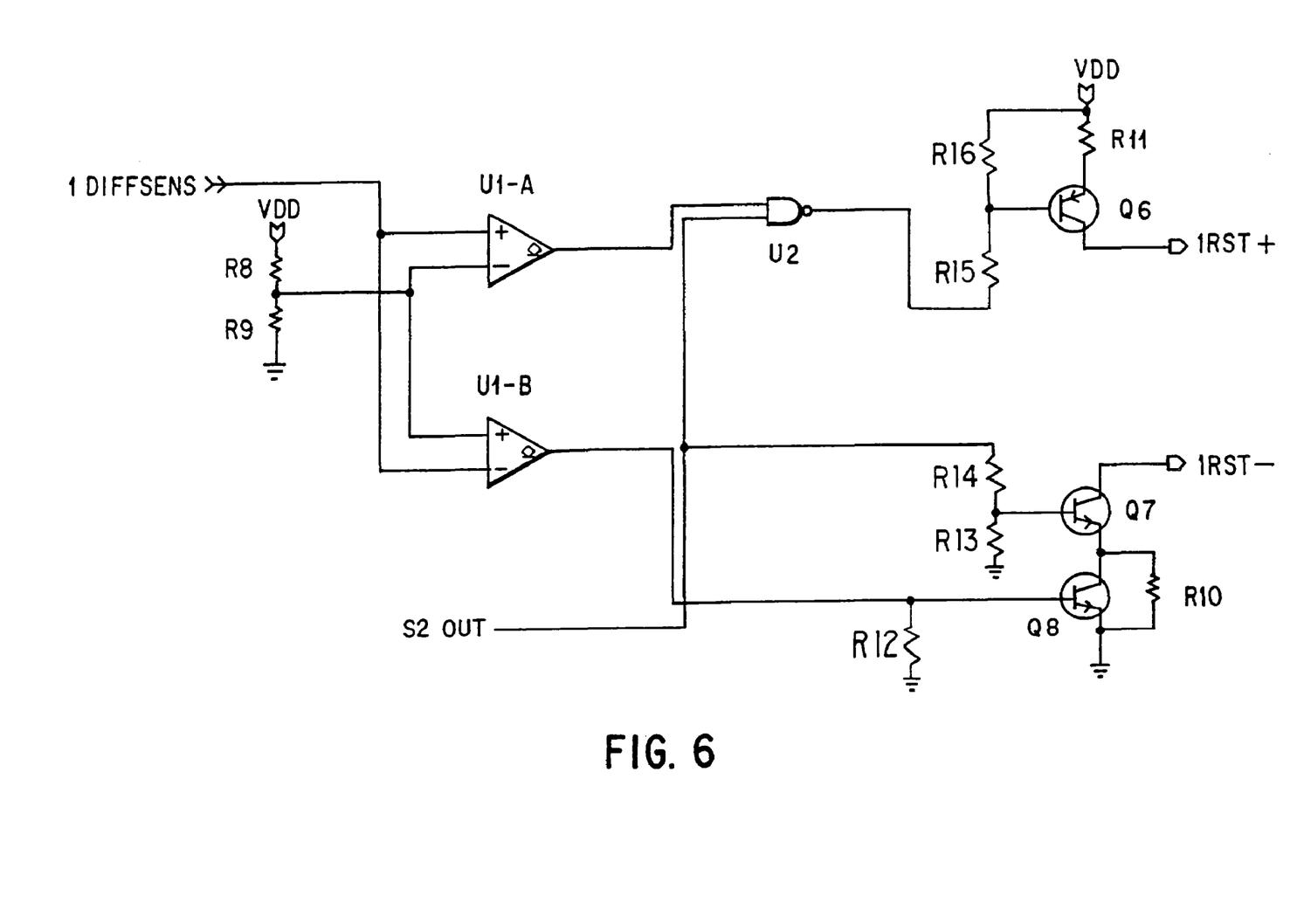
FIG. 6 is a logic block diagram for an embodiment of the State Activated One Shot with Extended Pulse Timing for Hot-Swap Applications wherein the output signal can be used in both single-ended and differential SCSI applications.

FIG. 6 shows an embodiment of the state activated one shot which enables its use with differential SCSI applications. In this application, the output of Schmitt trigger S2 is input to one input of a two input NAND gate U2 and, also, to the input of a transistor Q7. In addition, two comparators, U1-A and U1-B, are connected to provide complementary outputs. The output of the first comparator, U1-A, is input to the second input of NAND gate U2, while the output of the second comparator, U1-B, is input to transistor Q8. Resistors R8 and R9 act as a voltage divider, thereby setting a threshold voltage, (VDD*R9)/(R8+R9), for the complementary comparators, U1-A and U1-B. (In a preferred embodiment, the threshold is set at 0.7 Volts).

When differential outputs are desired, signal 1DIFFSENS goes HIGH. (In a preferred embodiment, 1DIFFSENS goes greater than 0.7 Volts). This causes the output of comparator U1-A to go logic HIGH. This will cause the NAND gate to track the output of Schmitt trigger, S2. For example, when the output of S2 is logic HIGH, the output of NAND gate U2 is low. Consequently, pnp transistor Q6 will be biased on and it will source current onto line 1RST+. On the other hand, when the output of S2 is logic LOW, the output of NAND gate U2 will go HIGH. Consequently, pnp transistor Q6 will be biased off, and no current will be sourced.

In addition, when signal 1DIFFSENS goes HIGH, the output of comparator U1-B will go logic LOW. This turns npn transistor Q8 off. As a result, current will flow through resistor RIO. Also, transistor Q7 will track the output of Schmitt trigger S2. For example, when the output of S2 is logic HIGH, npn transistor Q7 will be biased on and act as a current sink, sinking current on line 1RST−. On the other hand, when the output of S2 is logic LOW, npn transistor Q7 will be biased off. Consequently, it won't sink current.

If operation in single ended mode is desired, signal 1DIFFSENS goes LOW. (In a preferred embodiment, 1DIFFSENS goes less than 0.7 Volts). This causes the output of comparator U1-A to go logic LOW. This will cause the output of NAND gate U2 to always remain at logic HIGH. Consequently, pnp transistor Q6 will always be biased off and no current will be sourced onto line 1RST+.

In addition, when signal 1DIFFSENS goes LOW, the output of comparator U1-B will go logic HIGH. This turns npn transistor Q8 on. Consequently, current will flow through transistor Q8, and not resistor R10. Transistor Q7 will still track the output of Schmitt trigger S2. For example, when the output of S2 is logic HIGH, npn transistor Q7 will be biased on and act as a current sink, sinking current on line 1RST−. However, in this case (single-ended mode), the current will be sunk to ground, as opposed to being sunk through a resistor to ground (differential mode). When the output of S2 is logic LOW, npn transistor Q7 will be biased off. Consequently, it won't sink current. In a preferred embodiment, a switching apparatus can be substituted for transistor Q8.

While the invention has been disclosed in this patent application by reference to the details of preferred embodiments of the invention, it is to be understood that the disclosure is intended in an illustrative rather than in a limiting sense, as it is contemplated that modifications will readily occur to those skilled in the art, within the spirit of the invention and the scope of the appended claims.

We claim:

1. An apparatus for safe insertion and removal of a circuit board for hot swap applications comprising:
   a logic circuit having at least one input and at least one output; and
   a time extender circuit connected to said logic circuit, for extending an output signal of said logic circuit for a period of time after said circuit board is completely inserted and removed, wherein said time extender circuit further comprises:
   a resistor connected between ground and said logic circuit; and
   a capacitor connected between a voltage and said logic circuit.

2. The apparatus according to claim 1, wherein said logic circuit further comprises a NAND gate.

3. The apparatus according to claim 1, further comprising an enable logic gate connected to said at least one output of said logic circuit.

4. The apparatus according to claim 1, further comprising a transistor configured as an open collector having an input and an output whose input is connected to said at least one output of said logic circuit.

5. The apparatus according to claim 2, wherein said NAND gate further comprises:
   a plurality of transistors connected in parallel having a plurality of inputs and at least one output.

6. The apparatus according to claim 2, further comprising at least one inverter having an input and an output, wherein said input of said at least one inverter is connected to an output of said NAND gate.

7. The apparatus according to claim 5, further comprising at least one inverter having an input and an output, wherein said input of said at least one inverter is connected to said at least one output of said plurality of transistors.

8. The apparatus according to claim 6, wherein said at least one inverter is a Schmitt trigger inverter.

9. The apparatus according to claim 7, wherein said at least one inverter is a Schmitt trigger inverter.

10. The apparatus according to claim 7, further comprising:
    an enable logic gate connected to at least one of said outputs of said at least one inverter; and
    a transistor configured as an open collector having an input and an output whose input is connected to at least one of said outputs of said at least one inverter.

11. An apparatus for indicating the insertion and removal of a circuit board, comprising:
    a plurality of transistors connected in parallel having at least two inputs and at least one output;
    at least one other transistor having at least one output and at least one input connected to said at least one output of said plurality of transistors connected in parallel;
    at least one Schmitt trigger inverter having an input connected to said output of said at least one other transistor; and
    a time extender circuit connected to said at least one output of said at least one other transistor, wherein said time extender circuit further comprises:
    a resistor connected between ground and said logic circuit; and
    a capacitor connected between a voltage and said logic circuit.

12. The apparatus according to claim 11, further comprising a transistor configured as an open collector having an input and an output whose input is connected to said output of said at least one Schmitt trigger inverter.

13. The apparatus according to claim 11, further comprising:
    an enable logic gate connected to at least one of said outputs of said at least one Schmitt trigger inverter.

14. The apparatus according to claim 13, further comprising:
    a transistor configured as an open collector having an input and an out put whose input is connected to at least one of said outputs of said at least one Schmitt trigger inverter.

* * * * *

UNITED STATES PATENT AND TRADEMARK OFFICE
CERTIFICATE OF CORRECTION

PATENT NO.       : 6,961,795 B2
APPLICATION NO. : 10/623173
DATED            : November 1, 2005
INVENTOR(S)      : Michael John Erickson et al.

Page 1 of 1

It is certified that error appears in the above-identified patent and that said Letters Patent is hereby corrected as shown below:

In column 4, line 19, delete "RIO." and insert -- R10. --, therefor.

Signed and Sealed this

Fourth Day of August, 2009

JOHN DOLL
*Acting Director of the United States Patent and Trademark Office*